Aug. 22, 1967 J. C. MARTIN 3,336,856
COFFEE MAKING MACHINE HAVING METALLIC HOOD AROUND
A BASIN AND NON-METALLIC COVER THEREFOR
WITH POURING OPENING
Filed July 25, 1966 3 Sheets-Sheet 1
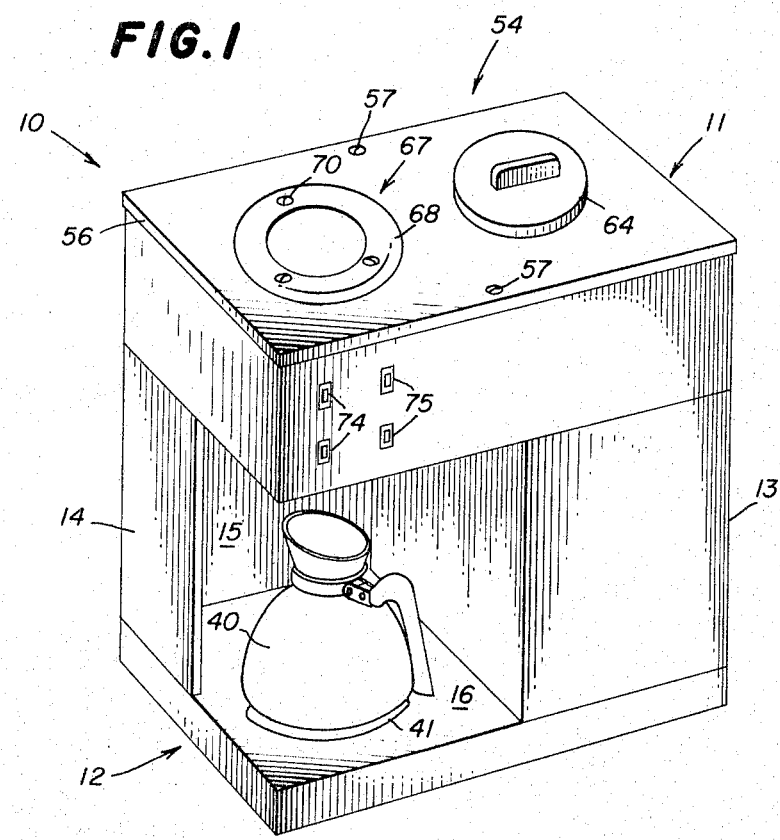
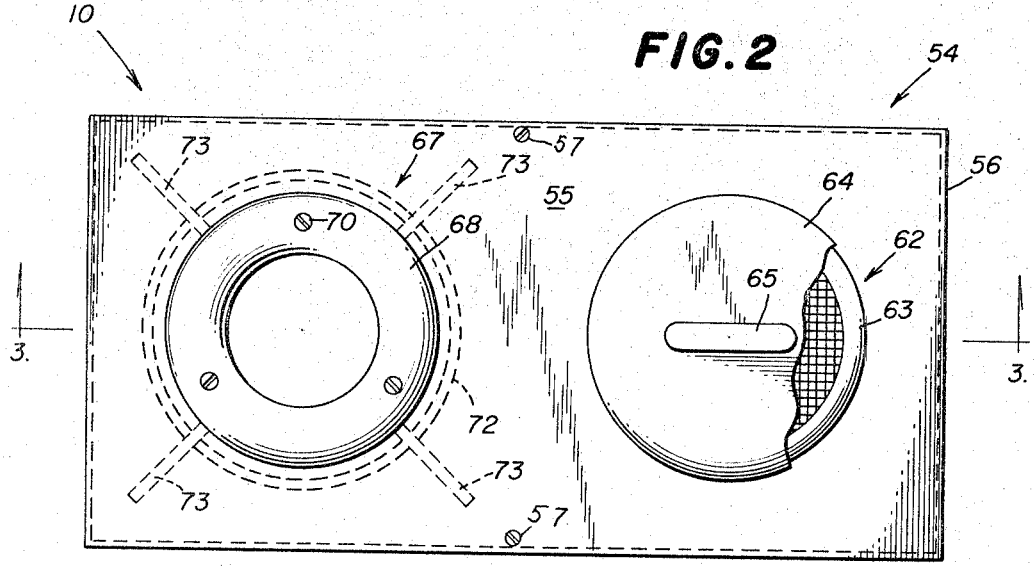

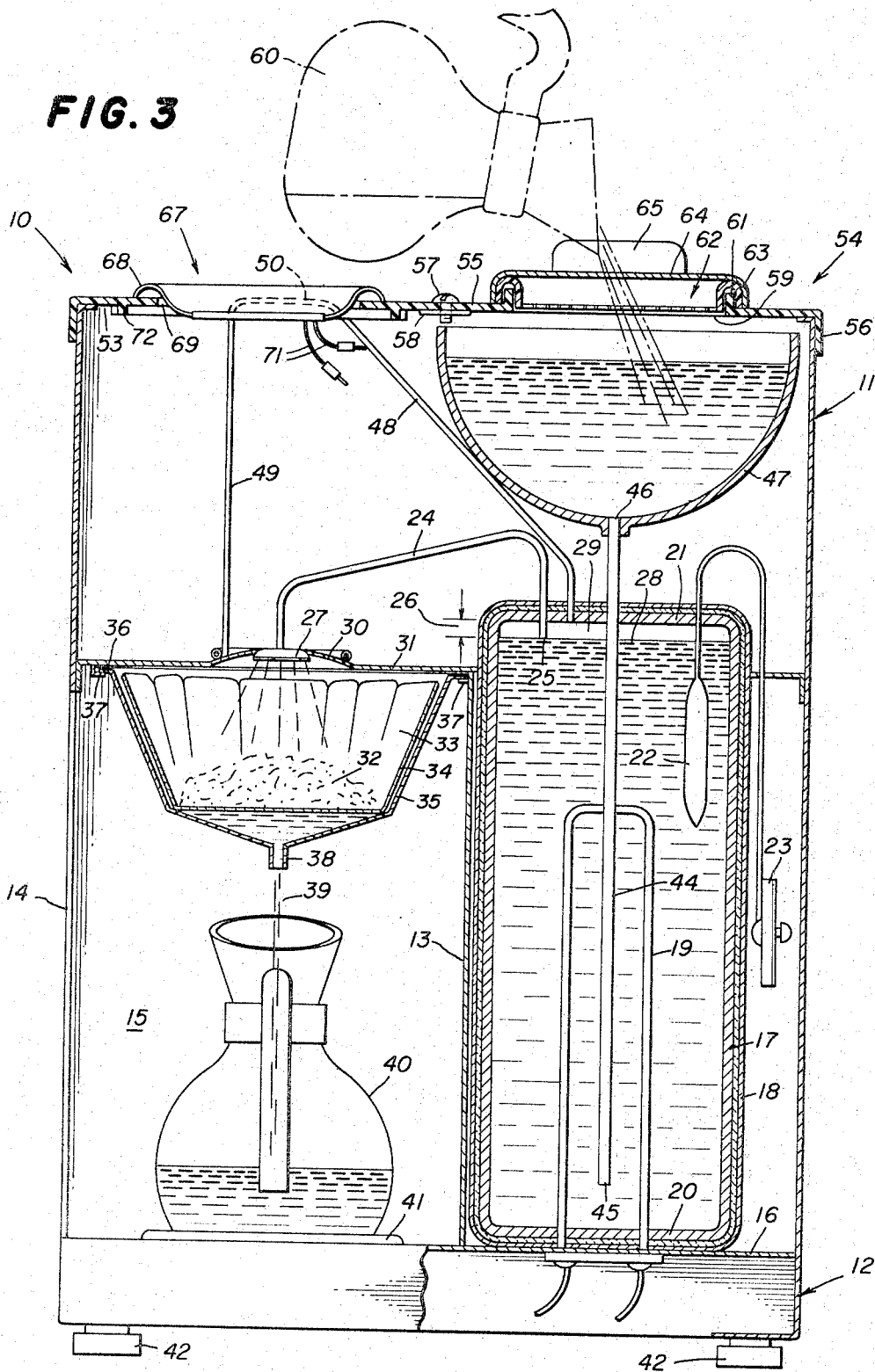

Aug. 22, 1967  J. C. MARTIN  3,336,856
COFFEE MAKING MACHINE HAVING METALLIC HOOD AROUND
A BASIN AND NON-METALLIC COVER THEREFOR
WITH POURING OPENING
Filed July 25, 1966  3 Sheets-Sheet 3

United States Patent Office 3,336,856
Patented Aug. 22, 1967

3,336,856
COFFEE MAKING MACHINE HAVING METALLIC HOOD AROUND A BASIN AND NON-METALLIC COVER THEREFOR WITH POURING OPENING
John C. Martin, Springfield, Ill., assignor to Bunn-O-Matic Corporation, Springfield, Ill., a corporation of Delaware
Filed July 25, 1966, Ser. No. 567,528
10 Claims. (Cl. 99—288)

ABSTRACT OF THE DISCLOSURE

The housing of a coffee making machine has a non-metallic cover with a screened opening through which cold water can be poured.

---

This invention relates, generally, to coffee making machines and it has particular relation to such machines as shown in U.S. Patent No. 3,220,334, issued Nov. 30, 1965.

Among the objects of this invention are: To provide for enclosing the basin with an open top metal enclosure having a non-metallic cover with an opening registering with the basin through which water can be poured; to employ a rectangular enclosure for the basin and a correspondingly shaped cover with the pouring opening near one end and a heating element near the other end; to provide screen holding means around the pouring opening and to detachably mount a plastic screen thereon; to locate the heating element in an opening around which depending integral rib means serve to reenforce the cover; and to detachably secure the cover to the metallic enclosure by means requiring the use of a tool to effect detachment.

According to this invention the cold water receiving basin has an open top metallic enclosure with a non-metallic cover that is secured in place by screws. The enclosure and cover are rectangular with an opening near one end through which water can be poured into the basin and another opening near the other end in which a heater element is located. An upstanding integral rim surrounds the pouring opening for detachably receiving the rim portion of a plastic screen. A cover overlies the screen. An integral flange depends from the edges of the cover, which is formed of thermoplastic material, and overlies the outer side of the metallic enclosure. The cover is reenforced by depending integral rib means around the opening for the heater element.

Figure 4:
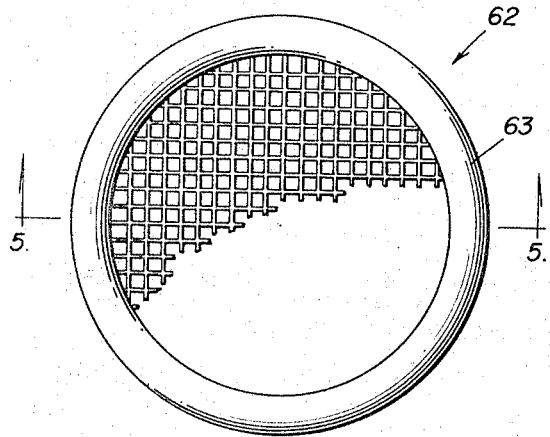
Figure 5:
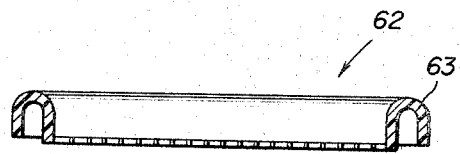
Figure 6:
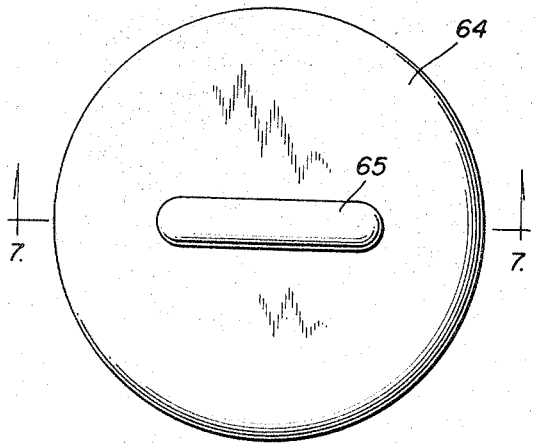
Figure 7:
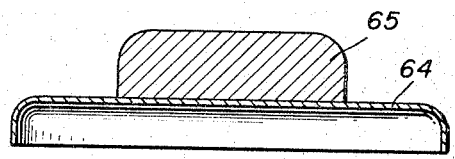

In the drawings: FIG. 1 is a perspective view of a machine for making coffee extract in which this invention is embodied. FIG. 2 is a top plan view of the coffee making machine shown in FIG. 1, a part of the cover for the screen being broken away in order to show the details of construction of the latter. FIG. 3 is a vertical sectional view taken generally along the line 3—3 of FIG. 2 and shows the details of construction of the coffee making machine. FIG. 4 is a top plan view, at an enlarged scale, of the plastic screen that is removably mounted on the cover for the coffee making machine. FIG. 5 is a vertical sectional view taken generally along the line 5—5 or FIG. 4. FIG. 6 is a top plan view of the metallic cover for the plastic screen, the showing being at an enlarged scale. FIG. 7 is a vertical sectional view taken generally along the line 7—7 of FIG. 6.

Referring now particularly to FIGS. 1, 2 and 3 of the drawings, the reference character 10 designates, generally, a machine for making coffee extract which embodies the present invention. In many respects the details of construction of the coffee making machine 10 are the same as or are quite similar to the details of construction of the coffee making machine disclosed in the patent above referred to. The machine 10 includes an upper cabinet or hood 11 that is relatively thick, a lower cabinet 12, that is relatively thin, a water tank enclosure 13 therebetween together with a side wall 14 and a rear wall 15. The cabinets 11 and 12, water tank enclosure 13 and walls 14 and 15 preferably are formed of corrosion resisting material, such as stainless steel, except for the cover for the upper cabinet or hood 11 to which reference will be made hereinafter.

Mounted on the upper wall 16 of the lower cabinet 12 is a water tank 17 that is provided with a covering 18 of insulation to prevent heat loss from water that normally is maintained at a relatively high temperature by a heating element 19 which is arranged to be connected to a suitable electric current source as described in the patent above referred to. The heating element 19 extends upwardly from the lower end 20 of the water tank 17 and is arranged to be energized in such manner as to maintain a constant supply of hot water in the tank 17.

Near the upper end 21 of the water tank 17 there is positioned a temperature responsive element 22 that extends outwardly of the water tank 17 for controlling the operation of a tank thermostat switch 23 in a conventional manner. The arrangement is such that water in the water tank 17 is maintained at an elevated temperature constantly. This makes it possible to promptly draw off a supply of hot water from the upper end of the water tank 17 for the purpose of making coffee extract in a manner to be described.

The hot water is drawn off through a discharge water line 24 with the arrangement being such that the hot water is siphoned out of the upper end of the water tank 17. One end 25 of the discharge water line 24 is preferably located at a distance indicated at 26 below the upper end 21. At its other end the discharge water line 24 is connected to a discharge head 27 that is provided with a plurality of openings for causing the hot water to spray downwardly as indicated. Near the end of the coffee extract making operation the hot water at the upper end of the water tank 17 continues to flow until the water level, as indicated by the broken line 28, coincides with the end 25 of the discharge water line 24. When this occurs, a space 29 filled with air is provided above the level 28 of the hot water in the tank 17. For each instance of the coffee extracting operation the flow of hot water stops when the water level reaches the position indicated by the line 28. This insures that the amount of hot water discharge is always equal to the amount of cold water that is poured into a basin 47 to be described. This equality provides a ready means for predetermining the amount of coffee extract which will be produced by measuring the amount of cold water being introduced. This might, for example, be varied from approximately 2 to 12 cups.

It will be noted that the discharge head 27 is located underneath an upwardly deformed portion 30 of a bottom wall 31 of the upper cabinet or hood 11. The discharge head 27 causes the hot water to be distributed over ground coffee 32 that is positioned at the bottom of a cup shaped member 33 of filter paper which is positioned on a wire grill 34 and thus spaced from the inner surface of a funnel 35. The funnel 35 is provided with a radially extending annular flange 36 that is arranged to slide along angles 37—37 which are secured to the under side of the bottom wall 31. This construction permits removal of the funnel 35 for removal of the member 33 of filter paper and the spent coffee grounds and replacement thereof.

The funnel 35 is provided on the under side with a discharge spout 38 through which coffee extract 39 flows into a beaker 40 located therebelow. The beaker 40 is positioned on a beaker warmer 41 that is carried by the upper wall 16 of the lower cabinet 12. Support feet 42—42 depend from the under side of the lower cabinet 12 for suitably supporting the machine 10 on a flat surface.

Provision is made for displacing a quantity of hot water at the upper end of the water tank 17 by introducing into the water tank 17 an equal amount of water, preferably cold water. For this purpose an inlet water line 44 is employed. As seen in FIG. 3, the inlet water line 44 extends downwardly through the upper end 21 of the water tank 17. Its lower end 45 is near the lower end 20 of the water tank 17. Thus the incoming cold water enters near the bottom of the water tank 17 and does not directly mix with the hot water at the top of the water tank 17 which is displaced and is transferred by the discharge water line 24 to the discharge head 27 for making the coffee extract 39. The upper end 46 of the inlet water line 44 extends above the upper end 21 of the water tank 17 and into the bottom of the basin 47 which has a liquid capacity somewhat in excess of the liquid capacity of the beaker 40.

The basin 47 is located within the enclosure provided by the upper cabinet or hood 11 in which the upper end of the water tank 17 and the discharge head 27 also are located.

In order to make certain that the cold water in the basin 47 can flow freely into the water tank 17, a vent tube 48 is employed. The vent tube 48 extends through the upper end 21 of the water tank 17 and opens into the space 29 above the water in the tank. The vent tube 48 extends upwardly to a position above the upper edge of the basin 47 and then a down turned end 49 opens into the upwardly deformed portion 30 of the bottom wall 31 where any water that might flow through the vent tube 48 can discharge into the funnel 35. A vent opening 50 is provided in the vent tube 48 at its highest point in order to break any siphoning action that might occur.

It is desirable that provision be made for readily inspecting and cleaning the basin 47. Also it is desirable that an additional heating element or beaker warmer be provided. The second heating element or beaker warmer can be employed either for heating an extra supply of hot water for tea making purposes or for maintaining a reserve beaker of coffee where needed. However, it is undesirable that the electrical connections to the additional heating element or beaker warmer be exposed to the person who normally operates the coffee making machine 10.

In accordance with this invention the upper cabinet or hood 11, which is formed of metal, has a generally rectangular opening 53 that essentially provides an open top construction. This opening is generally rectangular since the basin 47 is located at one end while the funnel 35 and parts associated therewith is located generally at the other end.

For closing the rectangular opening 53 there is provided a non-metallic cover that is indicated, generally, at 54. It forms a part of the upper cabinet or hood 11. Preferably the cover 54 is formed of a thermosetting plastic, such as a phenolic condensation product. For this purpose Bakelite resin can be used. A suitable die is provided for molding the non-metallic cover 54 in accordance with conventional practice.

The cover 54 includes a flat section 55 which overlies the rectangular opening 53. Along the edges of the flat section 55 there is an integral depending flange 56 which, as shown in FIG. 3, extends downwardly over the outer sides of the walls of the upper cabinet or hood 11 that are formed of metal. The cover 54 is held in place by screws 57 which are threaded into flanges, one of which is indicated at 58, that extend inwardly from the sides of the rectangular opening 53. In order to remove the cover 54 it is necessary to employ a tool, such as a screw driver.

The non-metallic cover 54 is formed with a circular opening 59 that registers with the basin 47 and is arranged to receive cold water as poured from a beaker that is indicated by broken lines at 60. The opening 59 is large enough to permit inspection of the interior of the basin 47 and to permit the entrance of the hand of the operator for cleaning purposes.

An upstanding flange 61 is formed integrally with the cover 54 around the opening 59 and it is used to center a removable screen that is indicated, generally, at 62 and shown in more detail in FIGS. 4 and 5. Preferably the screen 62 is formed of molded thermoplastic material such as polystyrene. Other thermoplastic materials can be employed. The removable screen 62 has an inverted U-shaped rim 63 that is arranged to overlie the upstanding flange 61 and hold the screen 62 in place. Also it permits ready removal thereof. A metallic cover 64 is arranged to overlie the removable screen 62. It has a handle 65 and is shown in more detail in FIGS. 6 and 7.

Advantage is taken of the space at the opposite end of the non-metallic cover 54 from the location of the basin 47 to provide additional heating means, indicated generally at 67. The heating means 67 is similar to the beaker warmer 41 and includes a saucer portion 68 that overlies a portion of the flat section 55 and extends downwardly through an opening 69 therein. Screws 70 extend through the saucer 68 to hold it firmly in position on the cover 54. Conductors 71 are indicated as extending from the heating means 67 and, as will be readily understood, they are arranged to be connected to a suitable current source. Since the heating means 67 is secured by the screws 70 to the cover 54 and since access is prevented to the conductors 71 through the opening 59 by the basin 47, it is not possible for anyone to come in contact with the conductors 71 other than by removing the screws 57.

The flat section 55 surrounding the opening 69 for the heating means 67 is reenforced by a depending annular rib 72 and by depending radial ribs 73, FIG. 2.

As shown in FIG. 1 control switches 74 are provided for controlling the energization of the beaker warmer 41 and the heating means 67 for an addition beaker. Indicating lights 75, associated with the switches 74, give a visible indication as to whether or not the beaker warmer 41 and the heating means 67 are energized.

While the cover 64 for the screen 62 is described as formed of metal, it will be understood that it can be formed of one piece molded thermoplastic material like the screen 62.

What is claimed as new is:

1. In a coffee making machine, in combination,
    a basin for receiving cold water to flow into a tank of hot water therebelow to displace the same to flow over ground coffee and produce coffee extract,
    means open at the top enclosing said basin, and extending to one side thereof,
    a non-metallic cover closing said open top and having an opening registering with said basin through which said cold water can be poured,
    an upstanding flange on said cover around said opening,
    screen means extending across said opening and having a rim portion overlying said flange, and
    heating means carried by that portion of said non-metallic cover extending to said one side of said basin.

2. The coffee making machine according to claim 1 wherein a cover overlies said screen means and said rim portion thereof.

3. In a coffee making machine, in combination,
    a basin for receiving cold water to flow into a tank of hot water therebelow to displace the same to flow over ground coffee and produce coffee extract,
    rectangular and metallic means open at the top, enclosing said basin, and extending to one side thereof,
    a non-metallic cover closing said open top and having an opening registering with said basin through which said cold water can be poured,
    said cover being formed of molded plastic material conforming to the shape of said basin enclosing means, having an integral depending flange along its edges overlying the upper portion of the outer surface of said basin enclosing means, and having an integral upstanding flange around said opening, screen means of molded plastic material extending across said opening and having an inverted integral U-shaped rim portion overlying said upstanding flange, and heating means carried by that portion of said non-metallic cover extending to said one side of said basin.

4. The coffee making machine according to claim 3 wherein said cover has a second opening for receiving said heating means, and integral rib means depend from the underside of said cover and around said second opening for reenforcing said cover.

5. The coffee making machine according to claim 4 wherein means detachably secure said cover to said basin enclosing means.

6. In a coffee making machine, in combination, a basin for receiving cold water to flow into a tank of hot water therebelow to displace the same to flow over ground coffee and produce coffee extract, means open at the top and enclosing said basin, a non-metallic cover closing said open top and having an opening registering with said basin through which cold water can be poured, upstanding flange means on said cover around said opening, and non-metallic screen means extending across said opening.

7. The coffee making machine according to claim 6 wherein a cover overlies said screen means and said flange means.

8. The coffee making machine according to claim 6 wherein said non-metallic cover has a depending flange along its edges overlying the upper portion of the outer surface of said basin enclosing means.

9. The coffee making machine according to claim 6 wherein said basin enclosing means is rectangular and extends to one side thereof, and said non-metallic cover conforms to the shape of said basin enclosing means.

10. The coffee making machine according to claim 9 wherein said non-metallic cover has a depending flange along its edges overlying the upper portion of the outer surface of said basin enclosing means.

References Cited

UNITED STATES PATENTS

| | | | |
|---|---|---|---|
| 2,507,633 | 5/1950 | Hill | 99—307 |
| 2,551,219 | 5/1951 | Peters et al. | 99—282 |
| 2,881,692 | 4/1959 | Volcov | 99—283 |
| 3,074,340 | 1/1963 | Walton | 99—283 |
| 3,220,334 | 11/1965 | Martin | 99—282 |
| 3,261,279 | 7/1966 | Kaplan et al. | 99—307 |

WALTER A. SCHEEL, *Primary Examiner.*

R. JENKINS, *Examiner.*